(12) United States Patent
Rhee et al.

(10) Patent No.: US 6,219,484 B1
(45) Date of Patent: Apr. 17, 2001

(54) METAL COATED OPTICAL FIBER ARRAY MODULE

(75) Inventors: Täe-hyung Rhee, Sungnam; Hyung-jae Lee, Yongin; Byong-gwon You, Daejeon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/140,388

(22) Filed: Aug. 26, 1998

(30) Foreign Application Priority Data

Aug. 27, 1997 (KR) .................................................. 97-41600

(51) Int. Cl.[7] ...................................................... G02B 6/36
(52) U.S. Cl. ................................. 385/137; 385/65; 385/83
(58) Field of Search ................................. 385/65, 83, 137

(56) References Cited

U.S. PATENT DOCUMENTS

| 4,702,547 | * | 10/1987 | Enochs | ..................................... | 385/49 |
| 5,519,799 | * | 5/1996 | Murakami et al. | ..................... | 385/78 |
| 5,784,509 | * | 7/1998 | Yamane et al. | ......................... | 385/49 |
| 5,793,914 | * | 8/1998 | Sasaki | ..................................... | 385/49 |
| 5,889,914 | * | 3/1999 | Gentsu | ................................. | 385/137 |
| 5,901,262 | * | 5/1999 | Kobayashi et al. | ..................... | 385/89 |

FOREIGN PATENT DOCUMENTS

| 0 645651A1 | 3/1995 | (EP) . |
| 60-500098 | 1/1985 | (JP) . |
| 62-89913 | 4/1987 | (JP) . |
| 63-226607 | * 9/1988 | (JP) . |
| 7-35958 | 2/1995 | (JP) . |
| WO 84/02582A1 | 7/1984 | (WO) . |

* cited by examiner

*Primary Examiner*—Rodney Bovernick
*Assistant Examiner*—Ellen E. Kim
(74) *Attorney, Agent, or Firm*—Robert E. Bushnell, Esq.

(57) ABSTRACT

A metal coated optical fiber array module including a metal coated optical fiber array, an arranging substrate having arranging grooves for loading the optical fiber array, wherein a metal is coated on the upper surface including the arranging grooves and the optical fiber array loaded into the arranging grooves is united therewith through the medium of the metal, and a cover for protecting and fixing the optical fiber array loaded into the arranging grooves of the arranging substrate. It is preferable that the optical fiber array module further includes a planar substrate having holes into which the optical fiber array is to be inserted, wherein the optical fiber array loaded on the arranging substrate is inserted into the holes and united with the arranging substrate. After the optical fibers are loaded, the ends thereof are easily polished. When the optical fibers are attached to a waveguide device, the ends of the arrayed optical fibers are enlarged to increase an attachment strength at the contact surface. The axes of the optical fibers are prevented from being tilted, by ultraviolet (UV) irradiation upon loading the optical fibers. Also, when the optical waveguide device is attached to a multi-core optical fiber, a contact surface is widened, thus improving environmental characteristics and reliability of a device package upon connection of the optical fibers.

24 Claims, 4 Drawing Sheets

METAL COATED OPTICAL FIBER ARRAY MODULE

CLAIM OF PRIORITY

This application makes reference to, incorporates the same herein, and claims all benefits accruing under 35 U.S.C §119 from an application entitled Metal Coated Optical Fiber Array earlier filed in the Korean Industrial Property Office on Aug. 27, 1997, and there duly assigned Ser. No. 97-41600 by that Office.

BACKGROUND OF THE INVENTION

1. Field of the Invention

The present invention relates to an optical fiber array module, and more particularly, to a metal coated optical fiber array module.

2. Description of the Related Art

Roughly three technologies are required to manufacture optical waveguide devices on various planar substrates using planar waveguide technology: waveguide design, waveguide fabrication, and packaging. Here, the packaging technology is the key to obtaining the best optical properties of the optical waveguide device. Particularly in manual devices, the connection between an optical fiber and an optical waveguide is an important factor in producing low-priced optical devices.

As for optical waveguide devices, waveguides can be arrayed at accurate intervals by exposure and etching, but it is very difficult to accurately arrange single-core and multi-core optical fibers when the optical fibers are attached to the waveguides. In general, when the optical fibers are arranged and arrayed, uniform holes for receiving the optical fibers are formed in a silicon substrate or metal substrate, and used to fix the optical fibers.

An accurate process is required to form a device for fixing the optical fibers. Also, when the ends of the optical fibers are polished after the optical fibers are loaded, careful attention is needed because the optical fibers are thin. Furthermore, since the thin optical fibers have a small surface area, they have only a small contact surface when attached to the waveguide device, leading to weak attachment. These problems deteriorate the overall performance of the waveguide device. Also, in a general optical fiber array module, optical fibers and grooves for fixing the optical fibers are damaged during polishing.

SUMMARY OF THE INVENTION

To solve the above problem, it is an objective of the present invention to provide an optical fiber array module using metal coated optical fibers, which can improve the attachment strength at a contact surface of the optical fibers by enlarging the cross sections of the arrayed fibers when attached to a waveguide device, prevent the axes of the optical fibers from being tilted due to ultraviolet irradiation upon loading the optical fibers, and increase the total performance of the waveguide device in the respect of packaging the optical waveguide device.

Accordingly, to achieve the above objective, there is provided a metal coated optical fiber array module using a metal coated optical fiber array, comprising: a metal coated optical fiber array; an arranging substrate having arranging grooves for loading the optical fiber array, wherein a metal is coated on the upper surface including the arranging grooves and the optical fiber array loaded into the arranging grooves is united therewith through the medium of the metal; and a cover for protecting and fixing the optical fiber array loaded into the arranging grooves of the arranging substrate.

It is preferable that the metal coated optical fiber array module further comprises a planar substrate having holes into which the optical fiber array is to be inserted, wherein the optical fiber array loaded on the arranging substrate is inserted into the holes and united with the arranging substrate.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
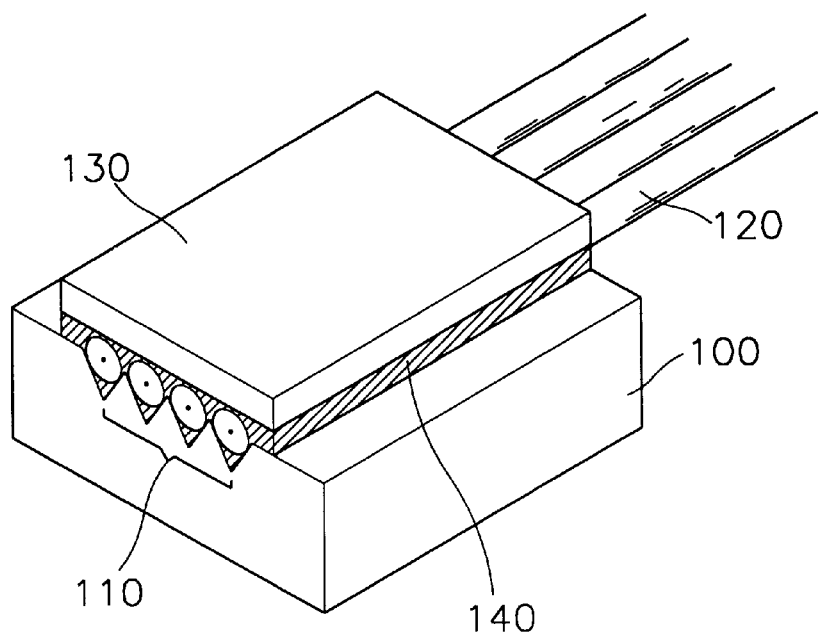
FIG. 1 shows an optical fiber array module formed by molding using a sealing agent and polishing a horizontal cross-section after arraying optical fibers along grooves formed in a metal-coated arranging substrate.
Figure 3:
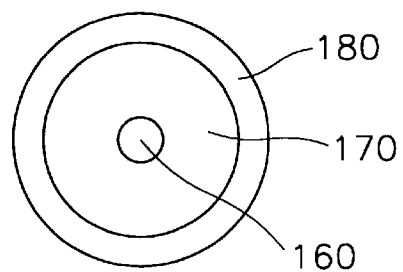
FIG. 3 is a cross-section of a metal coated optical fiber.

Referring to FIG. 1, an optical fiber array module according to a preferred embodiment of the present invention is comprised of an optical fiber array 120, an arranging substrate 100, and a cover 130. The optical fiber array 120 is coated with a weldable or solderable metal as shown in FIG. 3. The optical fiber array 120 can use single optical fibers or ribbon optical fibers. In FIG. 3, reference numeral 160 is an optical fiber core, reference numeral 170 is an optical fiber cladding, and reference numeral 180 is a metal coating film.

Figure 4:
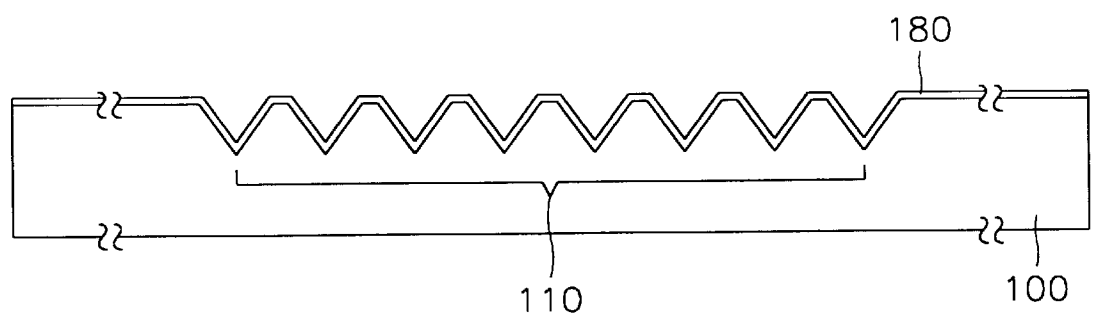
FIG. 4 is a cross-section of a metal coated optical fiber arranging substrate on which arranging grooves are formed.

The arranging substrate 100 has arranging grooves 110 for loading the optical fiber array 120. The arranging grooves 110 are V-shaped, or U-shaped (not shown), and arrange the optical fiber array 120. FIG. 4 shows a cross-section of the metal coated arranging substrate 100.

As shown in FIG. 4, a weldable or solderable metal (e.g., copper) is coated to a consistent thickness on the upper surface of the arranging substrate 100 including the arranging grooves 110, thus forming a metal coating film 180.

The arranging grooves 110 are attached to the optical fiber array 120 loaded in the arranging grooves 110 through the medium of the metal. The attachment is accomplished by laser welding or soldering. The cover 130 protects and fixes the optical fiber array loaded in the arranging grooves 110 of the arranging substrate 100.

Figure 2:
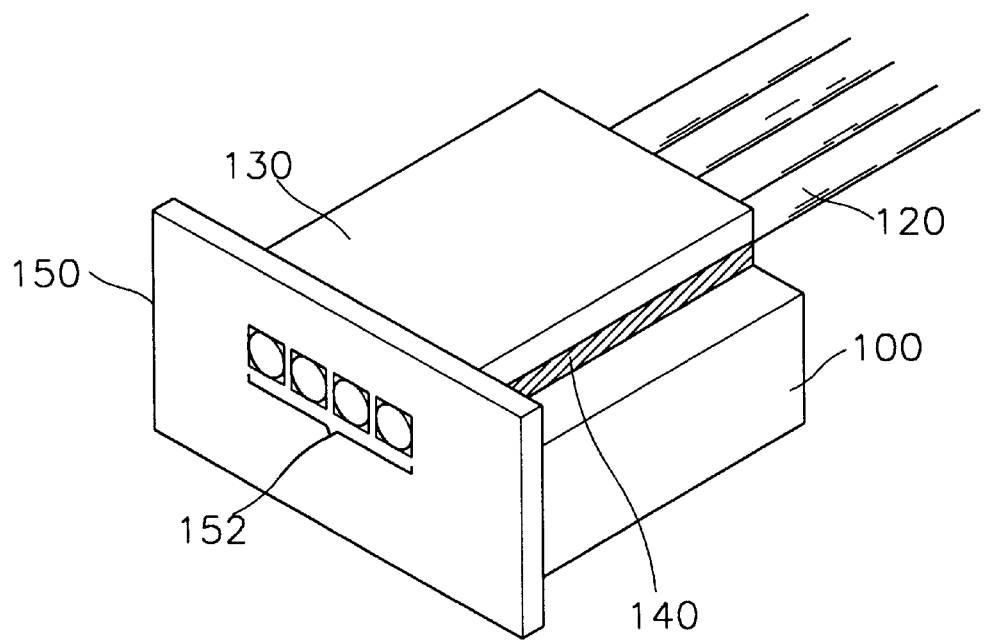
FIG. 2 shows an optical fiber array module formed by molding using a sealing agent and polishing a horizontal cross-section after attaching a planar substrate having processed holes to an arranging substrate on which the optical fibers shown in FIG. 1 are arrayed.
Figure 7:
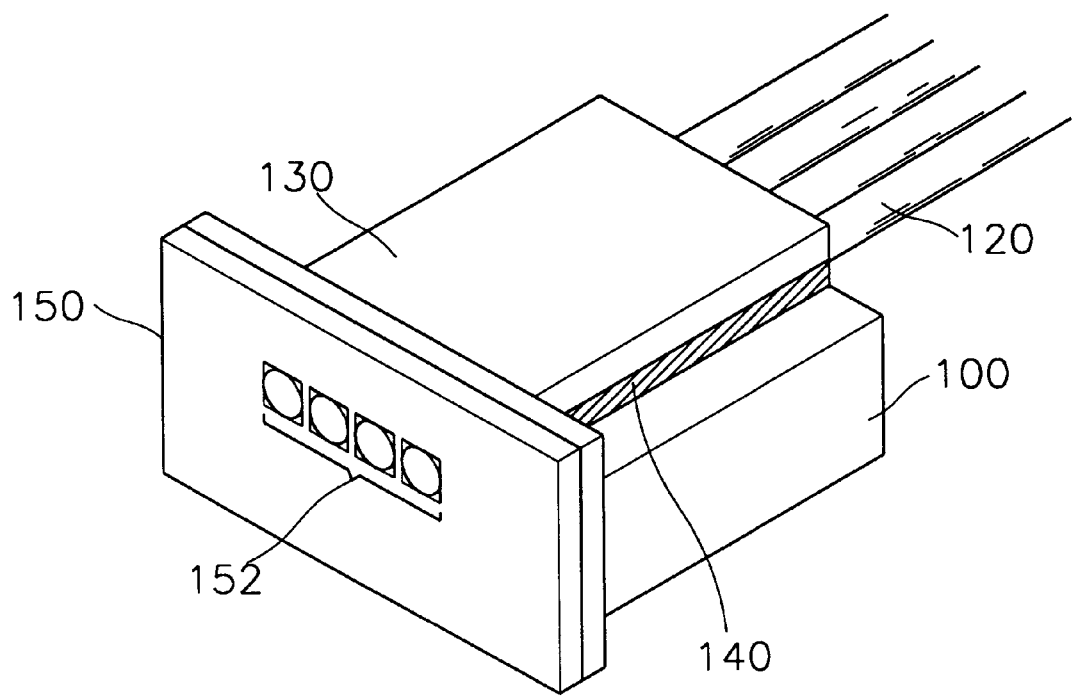
FIG. 7 is a perspective view of the optical array module of FIG. 2 in which a surface to contact an optical waveguide device is polished at an angle of θ.

FIG. 2 shows an optical fiber array module constituted by further providing a planar substrate 150, having arranging holes 152 into which the optical fiber array is to be inserted, to the optical fiber array module shown in FIG. 1. As shown in FIGS. 2 and 7, the arranging holes 152 of the planar substrate 150 have the same spacing as the arranging grooves 110 of the arranging substrate 100. If the arranging grooves 110 on the arranging substrate 100 are minutely twisted from the optical axis of the optical fiber array 120, the arranging holes 152 compensate for the twist, is used.

Figure 5:
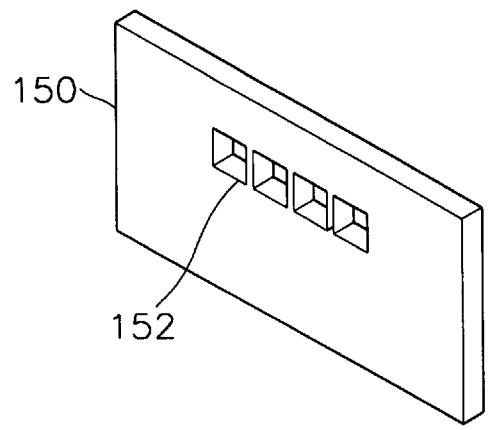
FIG. 5 shows a planar substrate having processed holes into which optical fibers are to be inserted.

Referring to FIG. 5, the arranging holes 152 are accurately formed in the planar substrate 150 using a solution or reactive vapor by mechanical processing, laser or semiconductor exposure and dry or wet etching. The arranging holes 152 are large enough for the metal coated optical fibers to be inserted therethrough. Also, the arranging holes 152 of the planar substrate may have cross-sections in the shape of a polygon, including a triangle, a square or a rectangle, a circle, or an oval. A solderable or weldable metal can be entirely or partially coated on the planar substrate.

Referring again to FIG. 2, when the optical fiber array 120 is loaded into the arranging grooves 110 of the arranging substrate 100 and fixed by soldering, the optical fiber array 120 protrudes past the edge of the arranging substrate 100 to be inserted through the arranging holes 152 of the planar substrate 150. Thereafter, the optical fibers protruding past the edge of the arranging substrate 100 are inserted into the arranging holes 152 of the planar substrate, and covered and protected by a cover 130. Then, the resultant structure is fixed by molding using a filling compound 140 (e.g., epoxy molding compound).

As shown in FIG. 7, according to needs, several planar substrates 150 having arranging holes 152 may be stacked and united.

After molding, protrusions of the optical fibers through the holes are polished to thereby form an optical fiber array capable of being accurately attached to an optical waveguide device (not shown). However, when a pre-polished substrate such as a silicon wafer is used, the polishing process can be omitted. As occasion demands, a substrate portion with holes of the manufactured optical fiber array module is polished at a predetermined angle 190 with respect to the optical axis if the optical fiber array to remove reflection loss. The angle 190 may be a vertical angle θ or a horizontal angle θ, wherein θ=0° to 20°. When angled polishing for reducing the reflection loss is not needed, the polishing process can be omitted by using the pre-polished substrate.

Meanwhile, in the optical fiber array module having no planar substrate 150, as shown in FIG. 1, the cross-section of the optical fiber array module to be coupled to an optical waveguide device (not shown) is polished at the horizontal angle θ (shown) or vertical angle θ (not shown), as needed, to thus reduce reflection loss.

Figure 6:
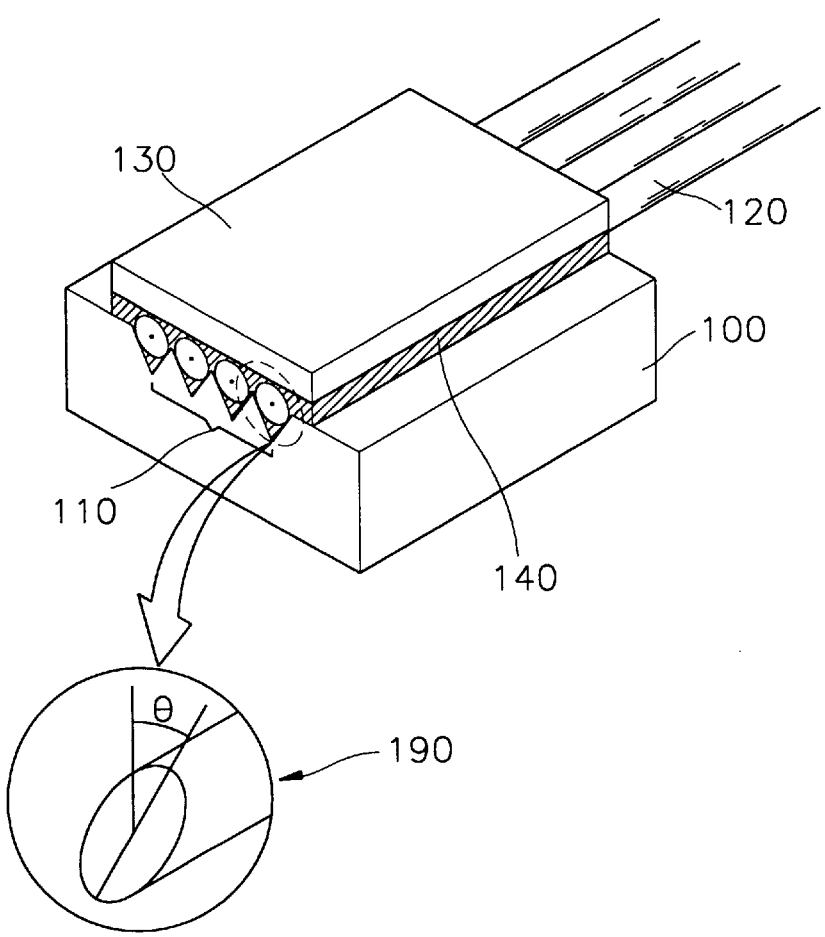
FIG. 6 is a perspective view of the optical array module of FIG. 1 in which a surface to contact an optical waveguide device is polished at an angle of θ.

FIG. 6 shows the optical fiber array module shown in FIG. 1 in which a surface contacting the optical waveguide device (not shown) is polished at the angle θ.

FIG. 7 shows the optical fiber array module shown in FIG. 2 in which a surface of planar substrate 150 contacting the optical waveguide device (not shown) is polished at the angle θ, and a stacked planar substrate 150 is used.

According to the present invention, after the optical fibers are loaded, the ends thereof are easily polished. When the optical fibers are attached to a waveguide device, the ends of the arrayed optical fibers are enlarged, leading to an improved attachment strength at the contact surface. The entire performance of the waveguide device is also improved in the respect of packaging of the optical waveguide device.

When an optical fiber array module is manufactured, the axes of the optical fibers are prevented from being tilted, by UV irradiation upon loading the optical fibers, thereby increasing the reliability of the optical fiber array module. Also, when the optical waveguide device is attached to a multi-core optical fiber, a contact surface is widened, thus improving environmental characteristics and reliability of a device package upon connection of the optical fibers.

The attachment of the optical fibers to the arranging substrate is accomplished by a reliable method such as laser welding or laser soldering. When the grooves on the arranging substrate are minutely twisted from the optical axis, a substrate having accurate holes for compensating for the twist is used, so that the accuracy of the optical axis increases.

What is claimed is:

1. A metal coated optical fiber array module, comprising:
   an optical fiber array having a metal coating;
   an arranging substrate having arranging grooves for loading the optical fiber array, wherein a metal is coated on an upper surface of said arranging substrate and arranging grooves, and after loading said optical fiber array into said arranging grooves, said optical fiber array is bonded to said arranging grooves through the medium of the metal, wherein the metal coated on the arranging substrate and arranging grooves is the same as said metal coating of said optical fiber array;
   a cover for protecting and fixing the optical fiber array loaded into the arranging grooves of the arranging substrate; and
   a planar substrate having a plurality of arranging holes through which the optical fiber array is to be inserted, wherein the optical fiber array loaded on the arranging substrate is inserted into the arranging holes and bonded with the arranging substrate.

2. The metal coated optical fiber array module as set forth in claim 1, wherein the optical fiber array comprises single optical fibers or an optical fibers ribbon.

3. The metal coated optical fiber array module as set forth in claim 1, wherein said metal is coated on a portion of said upper surface of the arranging substrate and the arranging grooves.

4. The metal coated optical fiber array module as set forth in claim 1, wherein said metal is coated on a surface portion of the planar substrate.

5. The metal coated optical fiber array module as set forth in claim 1, wherein said planar substrate is comprised of a plurality of stacked planar substrates.

6. The metal coated optical fiber array module as set forth in claim 1, wherein the arranging holes through the planar substrate have cross-sections having a shape of a polygon, a circle, or an oval, wherein said polygon comprises a triangle, a square or a rectangle.

7. The metal coated optical fiber array module as set forth in claim 1, wherein said optical fiber array, said cover and said arranging substrate are fixed by molding using a filling compound.

8. The metal coated optical fiber array module as set forth in claim 1, further comprising a filing compound, wherein said optical fiber array, said cover and said arranging substrate are fixed by molding using said filling compound.

9. The metal coated optical fiber array module as set forth in claim 1, wherein an end of the optical fiber array module to be connected to an optical waveguide device is polished at a vertical angle of 0° to 20°.

10. The metal coated optical fiber array module as set forth in claim 1, wherein an end of the optical fiber array module to be connected to an optical waveguide device is polished at a horizontal angle of 0° to 20°.

11. The metal coated optical fiber array module as set forth in claim 1, wherein an end of the planar substrate of the optical fiber array module to be connected to an optical waveguide device is polished at a vertical angle of 0° to 20°.

12. The metal coated optical fiber array module as set forth in claim 1, wherein the end of the planar substrate of the optical fiber array module to be connected to an optical waveguide device is polished at a horizontal angle of 0° to 20°.

13. The metal coated optical fiber array module as set forth in claim 1, wherein the arranging grooves of the arranging substrate are V-shaped or U-shaped.

14. The metal coated optical fiber array module as set forth in claim 1, wherein the optical fiber array with the arranging grooves of the arranging substrate are bonded by utilizing a laser.

15. The metal coated optical fiber array module as set forth in claim 1, wherein the optical fiber array with the arranging grooves of the arranging substrate are bonded by utilizing laser welding.

16. The metal coated optical fiber array module as set forth in claim 1, wherein the optical fiber array with the arranging grooves of the arranging substrate are bonded by utilizing laser soldering.

17. A metal coated optical fiber array module, comprising:
   an optical fiber array;
   a first metal coating disposed on said optical fiber array;
   an arranging substrate having arranging grooves for loading the optical fiber array;
   a second metal coated disposed on a portion of an upper surface of said arranging substrate and said arranging grooves, said optical fiber array being bonded to said arranging grooves through the medium of the first and second metals, wherein the material of the second metal is the same as the material of the first metal;
   a cover for protecting and fixing the optical fiber array loaded into the arranging grooves of the arranging substrate;
   a first planar substrate having a first plurality of arranging holes through which the optical fiber array is inserted; and
   a second planar substrate having a second plurality of arranging holes through which the optical fiber array is inserted.

18. The metal coated optical fiber array module as set forth in claim 17, wherein the optical fiber array comprises single optical fibers or an optical fibers ribbon.

19. The metal coated optical fiber array module as set forth in claim 17, wherein the first plurality of arranging holes through the first planar substrate have cross-sections having a shape of a polygon, a circle, or an oval, wherein said polygon comprises a triangle, a square or a rectangle.

20. The metal coated optical fiber array module as set forth in claim 17, wherein the second plurality of arranging holes through the second planar substrate have cross-sections having a shape of a polygon, a circle, or an oval, wherein said polygon comprises a triangle, a square or a rectangle.

21. The metal coated optical fiber array module as set forth in claim 17, wherein an end of the second planar substrate of the optical fiber array module to be connected to an optical waveguide device is polished at a vertical angle of 0° to 20°.

22. The metal coated optical fiber array module as set forth in claim 17, wherein an end of the second planar substrate of the optical fiber array module to be connected to an optical waveguide device is polished at a horizontal angle of 0° to 20°.

23. The metal coated optical fiber array module as set forth in claim 17, further comprising a filing compound for fixing said optical fiber array, said cover and said arranging substrate to each other.

24. The metal coated optical fiber array module as set forth in claim 23, wherein said filling compound comprises an epoxy molding compound.

* * * * *